(12) United States Patent
Bergerhoff et al.

(10) Patent No.: US 7,854,358 B2
(45) Date of Patent: Dec. 21, 2010

(54) CARRIER FOR AT LEAST ONE BICYCLE

(75) Inventors: Harald Bergerhoff, Hamburg (DE); Michael Waller, Hamburg (DE); Gerald Hahn, Wistedt (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 816 days.

(21) Appl. No.: 11/773,077

(22) Filed: Jul. 3, 2007

(65) Prior Publication Data

US 2008/0006664 A1 Jan. 10, 2008

(30) Foreign Application Priority Data

Jul. 8, 2006 (DE) .................... 10 2006 031 690

(51) Int. Cl.
*B60R 9/10* (2006.01)

(52) U.S. Cl. .................... 224/497; 224/281; 224/496; 224/924; 224/510

(58) Field of Classification Search ............... 224/282, 224/496, 497, 508, 924, 489, 491, 281, 495, 224/510; 403/109.3
See application file for complete search history.

(56) References Cited

U.S. PATENT DOCUMENTS

| | | | | |
|---|---|---|---|---|
| 2,975,401 A * | 3/1961 | Shupe | .................... | 340/431 |
| 3,331,957 A * | 7/1967 | Adams et al. | ............... | 362/485 |
| 3,367,548 A * | 2/1968 | Cooper | .................... | 224/533 |
| 4,234,908 A * | 11/1980 | McGee | .................... | 362/506 |
| 5,157,591 A * | 10/1992 | Chudzik | .................... | 362/486 |
| 5,433,552 A * | 7/1995 | Thyu | .................... | 403/378 |
| 6,164,804 A * | 12/2000 | Self | .................... | 362/485 |
| 6,179,514 B1 * | 1/2001 | Cheng | .................... | 403/377 |
| 6,322,238 B1 * | 11/2001 | Barr | .................... | 362/543 |
| 7,040,832 B2 * | 5/2006 | Hsieh | .................... | 403/109.3 |
| 7,108,408 B2 * | 9/2006 | Tinklenberg | .................... | 362/485 |
| 7,121,597 B2 * | 10/2006 | Chuang | .................... | 293/117 |
| 7,239,231 B2 * | 7/2007 | Tsukamoto | .................... | 340/438 |
| 7,389,898 B2 * | 6/2008 | Riemer et al. | ............... | 224/509 |
| 7,581,857 B1 * | 9/2009 | Sisko | .................... | 362/485 |
| 7,757,916 B1 * | 7/2010 | Petrie et al. | ............... | 224/403 |
| 2007/0090142 A1 * | 4/2007 | Chuang | .................... | 224/496 |
| 2007/0205617 A1 * | 9/2007 | Hahn et al. | ............... | 293/119 |
| 2008/0006662 A1 * | 1/2008 | Bergerhoff et al. | .......... | 224/400 |

(Continued)

FOREIGN PATENT DOCUMENTS

DE 43 40 009 C2 6/1995

(Continued)

*Primary Examiner*—Justin M Larson
(74) *Attorney, Agent, or Firm*—Brooks Kushman P.C.

(57) ABSTRACT

A bicycle carrier includes a base holder mountable to a vehicle and a support holder for holding a bicycle. The support holder is movably connected to the base holder to be movable along a longitudinal direction of the vehicle between a neutral position in which the holders extend over one another and an operating position in which the support holder extends out from the base holder. A tail light is movably connected to the support holder to be movable between a stored position in which the tail light is stowed in the support holder when the support holder is in the neutral position and a functional position in which the tail light extends out from the support holder and is orientated transversely to the longitudinal vehicle direction when the support holder is in the operating position.

10 Claims, 5 Drawing Sheets

U.S. PATENT DOCUMENTS

| | | | |
|---|---|---|---|
| 2008/0006663 A1* | 1/2008 | Bergerhoff et al. | 224/400 |
| 2008/0006664 A1* | 1/2008 | Bergerhoff et al. | 224/495 |
| 2008/0006665 A1* | 1/2008 | Bergerhoff et al. | 224/497 |
| 2008/0006667 A1* | 1/2008 | Bergerhoff et al. | 224/533 |

FOREIGN PATENT DOCUMENTS

| | | |
|---|---|---|
| DE | 102 57 903 A1 | 6/2004 |
| DE | 103 48 679 A1 | 6/2005 |
| DE | 10 2004 021 709 A1 | 12/2005 |
| DE | 10 2004 035 429 A1 | 3/2006 |

* cited by examiner

US 7,854,358 B2

CARRIER FOR AT LEAST ONE BICYCLE

CROSS-REFERENCE TO RELATED APPLICATIONS

This application claims foreign priority benefits under 35 U. S. C. §119(a)-(d) to DE 10 2006 031 690.8, filed Jul. 8, 2006, which is hereby incorporated by reference in its entirety.

BACKGROUND OF THE INVENTION

1. Field of the Invention

The present invention relates to a bicycle carrier for a motor vehicle.

2. Background Art

DE 10 2004 035 429 A1 describes a bicycle carrier for a vehicle. The carrier includes a base holder designed to be pulled out from the vehicle. A transverse beam connects two inter-spaced lighting elements to the base holder. The lighting elements are movable between a neutral position and a usable position. For this purpose, the lighting elements are pushed toward the outer side of the vehicle.

DE 102 57 903 A1 describes an extendable load carrier for a vehicle. The carrier includes a longitudinally movable load holder. Two inter-spaced lighting elements are at the rear end of the load holder. The lighting elements are movable in the transverse direction of the vehicle between two positions.

DE 43 40 009 C2 describes a vehicle having a rear transport bridge for transporting a bicycle. The transport bridge includes a carrier system attached to the underside of the vehicle. The carrier system has an extendable support having a fold-up railing on its rear side. A headlight mounted on the railing is oriented toward the base of the vehicle when the railing is folded down and the support is pushed in.

SUMMARY OF THE INVENTION

An object of the present invention includes a bicycle carrier for a vehicle in which the bicycle carrier includes tail lights operable to function in a neutral position and an operating position of the bicycle carrier.

In carrying out the above object and other objects, the present invention provides a bicycle carrier having a base holder mountable to a vehicle and a support holder for holding a bicycle. The support holder is movably connected to the base holder to be movable along a longitudinal direction of the vehicle between a neutral position in which the holders extend over one another and an operating position in which the support holder extends out from the base holder. A tail light(s) is movably connected to the support holder to be movable between a stored position in which the tail light is stowed in the support holder when the support holder is in the neutral position and a functional position in which the tail light extends out from the support holder and is orientated transversely to the longitudinal vehicle direction when the support holder is in the operating position.

Advantages achieved by a bicycle carrier in accordance with embodiments of the present invention are that the tail lights in the operating position of the carrier may be fixed in a functional position, and the function as tail lights may then be realized in a specific manner. In contrast, in the neutral position of the carrier the tail lights may be placed in a space-saving stored position. Quick-release devices which may be implemented by reasonable technical means are provided to move the tail lights between the stored and functional positions. A simple plug-in connection having a receiving element and an insertion element which may be easily operated is suitable for a quick-release device. This also applies to the fixing element for the quick-release device, which by a spring-loaded locking member positions the insertion element relative to the receiving element. The locking member is influenceable by an actuating mechanism. The spring element includes a compression spring. The actuating mechanism has a convertible actuating pin having a guide section enclosed by the compression spring. The actuating pin includes a first stop for a first end side of the compression spring. The compression spring is supported at a second end side on an inner side of a stop wall of a housing section. A bearing bolt designed as an extension of the actuating pin passes through the stop wall and also passes through a hand lever which can axially move the actuating pin. The hand lever has an ergonomic design which facilitates operation of the fixing element. An electrical switching device between the holders allows the tail lights to be switched off in the stored position in order to eliminate interfering light effects from the tail lights when in the stored position, and switched on in the functional position.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
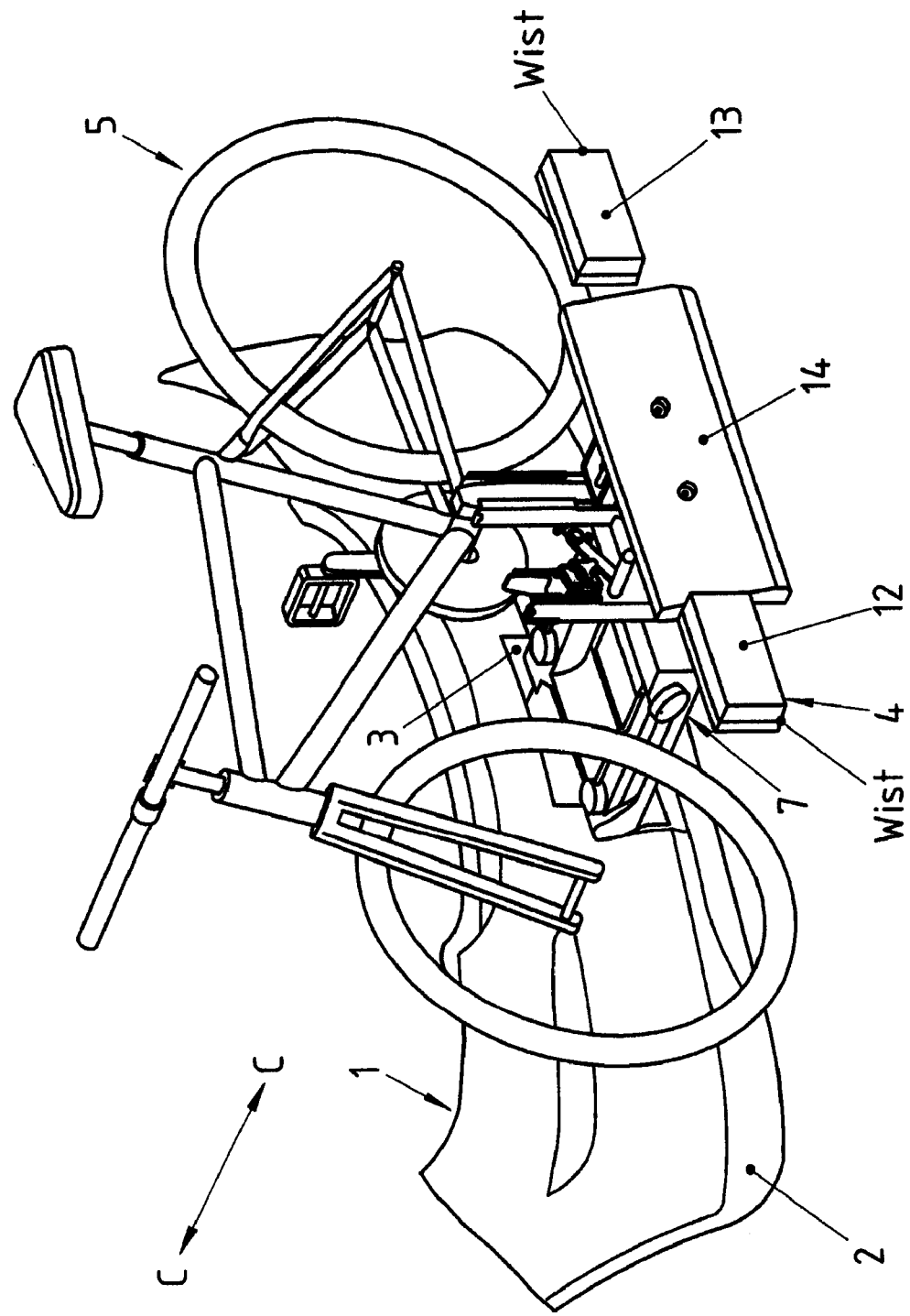
FIG. 1 illustrates a perspective view of a vehicle having a bicycle carrier in accordance with an embodiment of the present invention.

Identical or similar components have the same reference numerals in the figures.

Referring now to FIG. 1, a perspective view of a rear end portion 2 of a vehicle 1 having a bicycle carrier 4 in accordance with an embodiment of the present invention is shown. Rear end vehicle portion 2 has an opening 3 running along a central longitudinal plane B-B of vehicle 1 (see FIG. 2) for receiving an extension of carrier 4 in order for carrier 4 to be mounted to vehicle 1. Carrier 4 is intended for use with vehicle 1 to transport two upright bicycles side-by-side.

Figure 2:
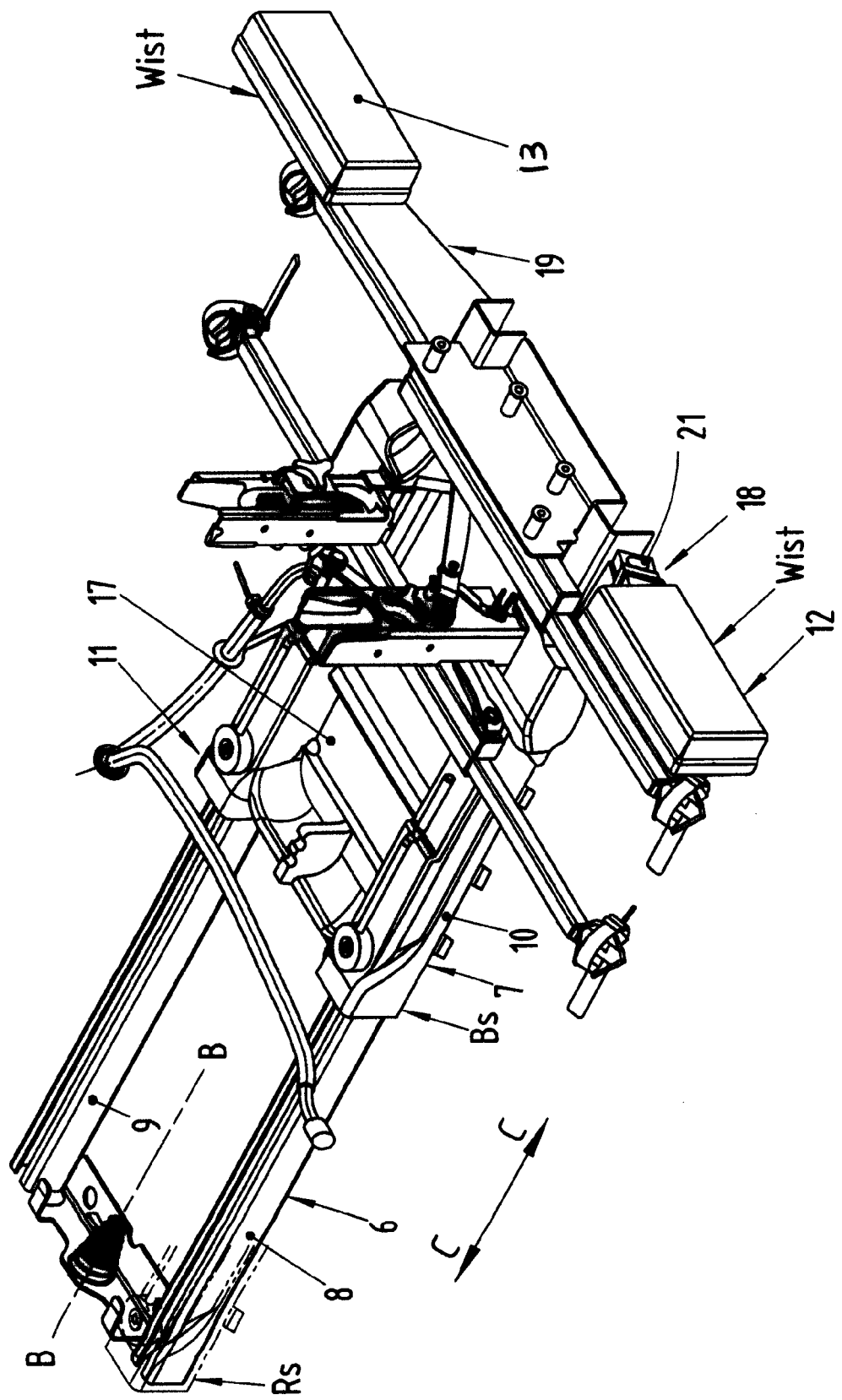
FIG. 2 illustrates a perspective view of the bicycle carrier in an operating position.
Figure 3:
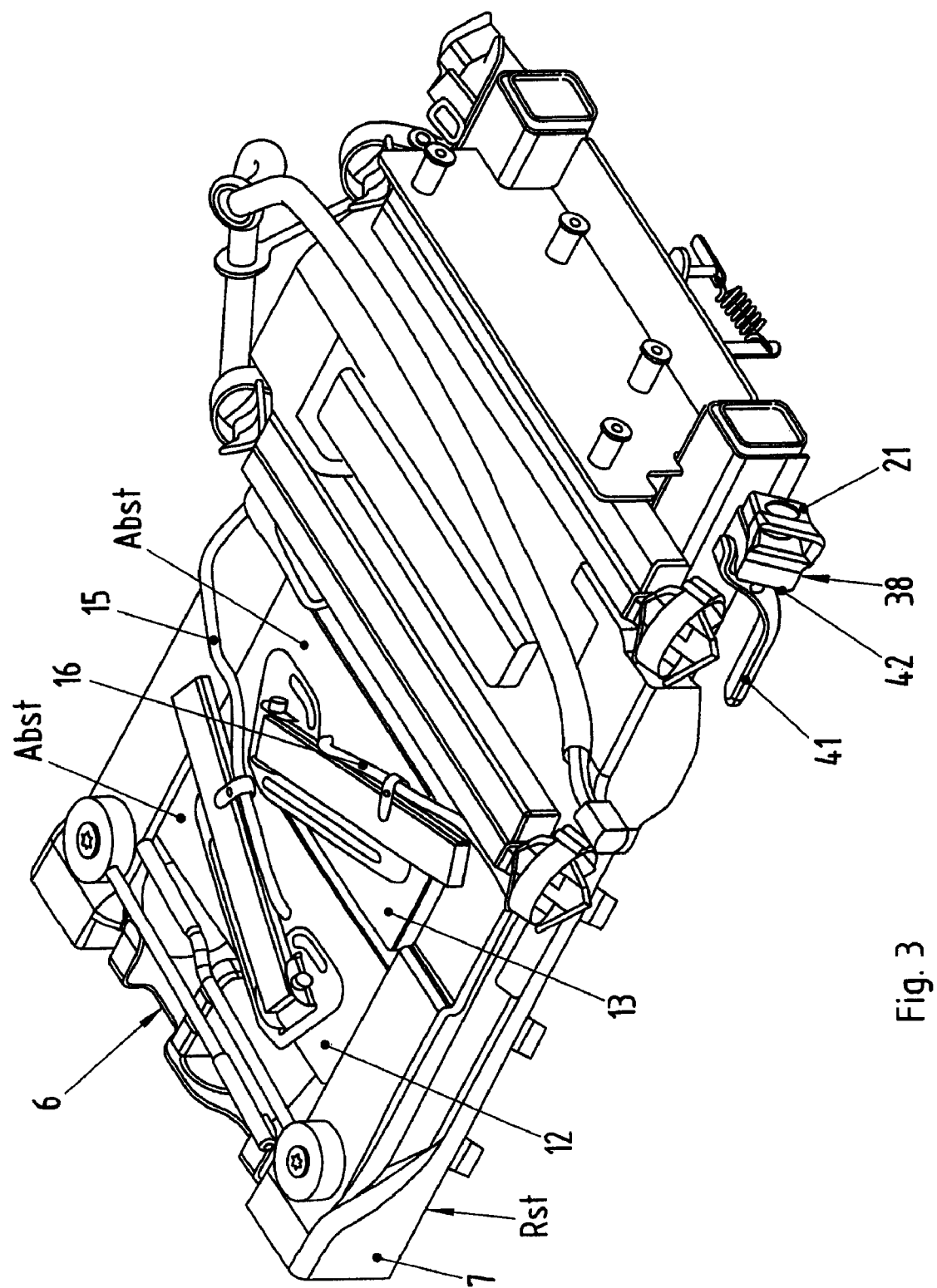
FIG. 3 illustrates a perspective view of the bicycle carrier in a neutral position.

Referring now to FIGS. 2 and 3, with continual reference to FIG. 1, perspective views of carrier 4 in an operating position Bs and in a neutral position Rs are respectively shown. Carrier 4 includes a base holder 6 and a support holder 7. A pair of bicycles aligned transversely to longitudinal direction C-C of vehicle 1 may mount onto support holder 7. FIG. 1 illustrates a bicycle 5 mounted onto support holder 7 in this manner. Support holder 7 is movable relative to base holder 6 along longitudinal vehicle direction C-C between neutral position Rs and operating position Bs. In neutral position Rs, support holder 7 extends over base holder 6 such that carrier 4 has a compact form. In operating position Bs, support holder 7 extends out from base holder 6 such that carrier 4 has an extended form. Support holder 7 may hold bicycle 5 during operation of vehicle 1 while support holder 7 is in operating position Bs as support holder 7 is extended out from vehicle 1. FIG. 1 illustrates support holder 7 holding bicycle 5 while in its operating position Bs.

In order to enable support holder 7 to be movable relative to base holder 6, base holder 6 includes inner guide rails 8, 9 and support holder 7 includes corresponding outer guide rails 10, 11. Inner guide rails 8, 9 are transversely spaced apart from one another on respective sides of base holder 6 and run along longitudinal vehicle direction C-C. As such, inner guide rails 8, 9 are on respective sides of central longitudinal plane B-B. Likewise, outer guide rails 10, 11 are transversely spaced apart from one another on respective sides of support holder 7 and run along longitudinal vehicle direction C-C. As such, outer guide rails 10, 11 are on respective sides of central longitudinal plane B-B. Inner guide rails 8, 9 cooperate with outer guide rails 10, 11 to enable support holder 7 to move relative to base holder 6 along longitudinal vehicle direction C-C between neutral position Rs and operating position Bs.

A panel wall 14 is connected to support holder 7. Panel wall 14 closes off opening 3 on both sides of central longitudinal plane B-B when support holder 7 is in neutral position Rs. Tail lights 12, 13 are positioned on respective ends of panel wall 14. Each tail light 12, 13 has an approximately rectangular body. Tail lights 12, 13 are respectively connected to a vehicle electrical system by electrical cables 15, 16. Tail lights 12, 13 are movable between a functional position Wist when support holder 7 is in operating position Bs and a stored position Abst when support holder 7 is in neutral position Rs. FIG. 2 illustrates tail lights 12, 13 in functional position Wist. FIG. 3 illustrates tail lights 12, 13 in stored position Abst.

Tail lights 12, 13 stow in a storage compartment 17 of support holder 7. Tail lights 12, 13 are flatly folded and largely countersunk within storage compartment 17 when tail lights 12, 13 are stowed in storage compartment 17. From stored position Abst, an operator of vehicle 1 may manually move tail lights 12, 13 to functional position Wist.

Quick-release devices 18, 19 respectively associated with tail lights 12, 13 fix tail lights 12, 13 in place when tail lights 12, 13 are in functional position Wist. Tail lights 12, 13 are structurally and functionally similar and quick-release devices 18, 19 are structurally and functionally similar. As such, the description below regarding tail light 12 and quick-release device 18 corresponds to tail light 13 and quick-release device 19.

Figure 4:
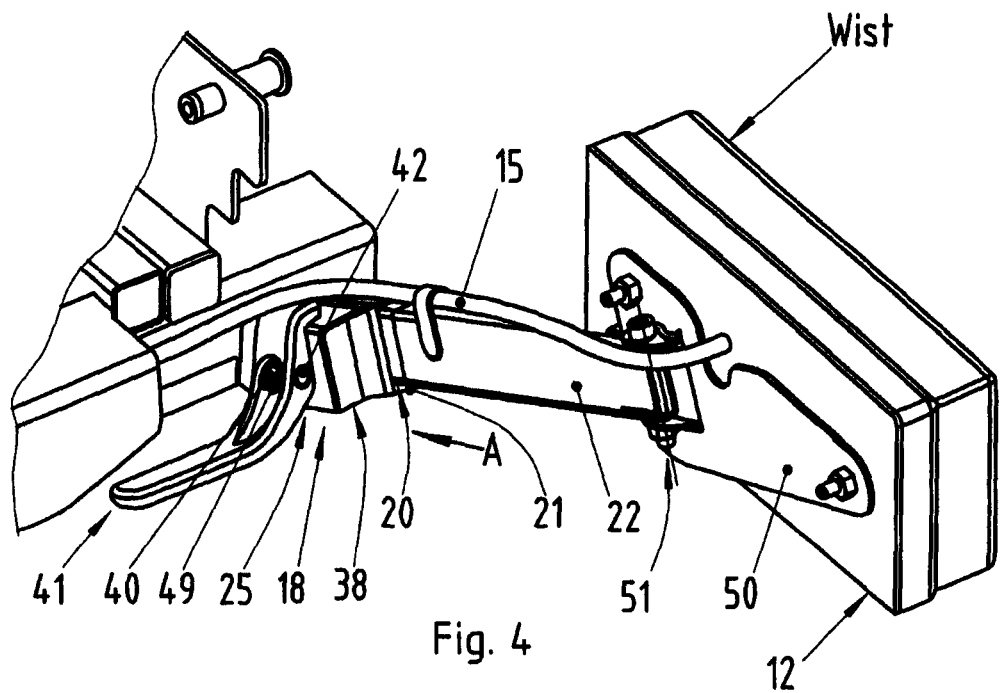
FIG. 4 illustrates a view of a tail light of the bicycle carrier in a functional position.
Figure 5:
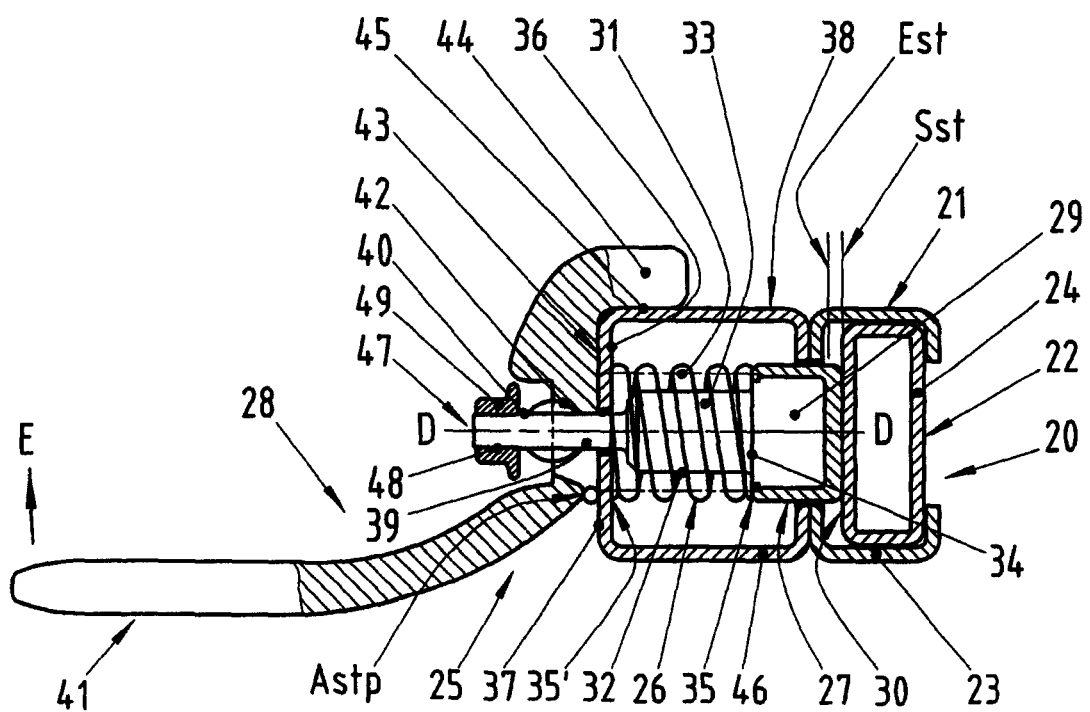
FIG. 5 illustrates a view in the direction of arrow A of FIG. 4.

Referring now to FIGS. 4 and 5, with continual reference to FIGS. 1, 2, and 3, views of tail light 12 in functional position Wist and in the direction of arrow A of FIG. 4, are respectively shown. Quick-release device 18 for tail light 12 includes a plug-in connection 20. Plug-in connection 20 includes a receiving element 21 and an insertion element 22. Receiving element 21 and insertion element 22 are respectively formed by tubular bodies 23, 24. Tubular bodies 23, 24 have a square or rectangular cross section. Insertion element 22 is attached to tail light 12.

Quick release device 18 also includes a fixing element 25. Fixing element 25 is mounted on support holder 7. Fixing element 25 fixes insertion element 22 relative to receiving element 21 via a locking member 27 spring loaded by a spring element 26. Spring element 26 is a compression spring 31. Locking member 27 includes a pressure plate 29. Pressure plate 29 cooperates with a supporting wall 30 of insertion element 22. Pressure plate 29 may include a friction enhancing lining on its side facing supporting wall 30. Spring element 26 is biased to move pressure plate 29 of locking member 27 into a locked position Sst.

An actuating mechanism 28 is operable to control locking member 27 to move locking member 27 between locked position Sst and an unlocked position Est. Actuating mechanism 28 includes an actuating pin 32. Actuating pin 32 has a guide section 33. Compression spring 31 encloses guide section 33. Guide section 33 includes a first stop 34 for a first end side 35 of compression spring 31. Guide section 33 is supported at a second end side 35' on an inner side 36 of a stop wall 37 of a housing 38. Actuating pin 32 includes a bearing bolt 40. An extension 39 of bearing bolt 40 passes through stop wall 37 of housing 38.

A hand lever 41 associated with bearing bolt 40 is able to axially move actuating pin 32 along axial direction D-D. Hand lever 41 is movable about an axial pin 42 orientated transversely to bearing bolt 40. Hand lever 41 rests against stop wall 37 at a support track 43. Support track 43 produces axial lifting motions (axial direction D-D) of actuating pin 32 in response to hand lever 41 moving about axial pin 42. When hand lever 41 is moved in direction E, pressure plate 29 moves into unlocked position Est and support track 43 moves about support point Atsp.

An alignment element 44 is connected to hand lever 41. Alignment element 44 rests against a wall 45 of housing 38. Alignment element 44 returns hand lever 41 to its provided position when any radial motion occurs about actuating pin 32. Housing 38 is part of a tubular body 46 which is directly on receiving element 21. Free end 47 of bearing bolt 40 includes a thread 48 for a screw nut 49 by which hand lever 41 is fastened to actuating pin 32.

A mounting bracket 50 connects insertion element 22 to tail light 12. Insertion element 22 couples to mounting bracket 50 via an articulated joint 51 such that insertion element 22 in stored position Abst represents a compact unit together with tail light 12 and in functional position Wist assumes the mounted position.

Figure 6:
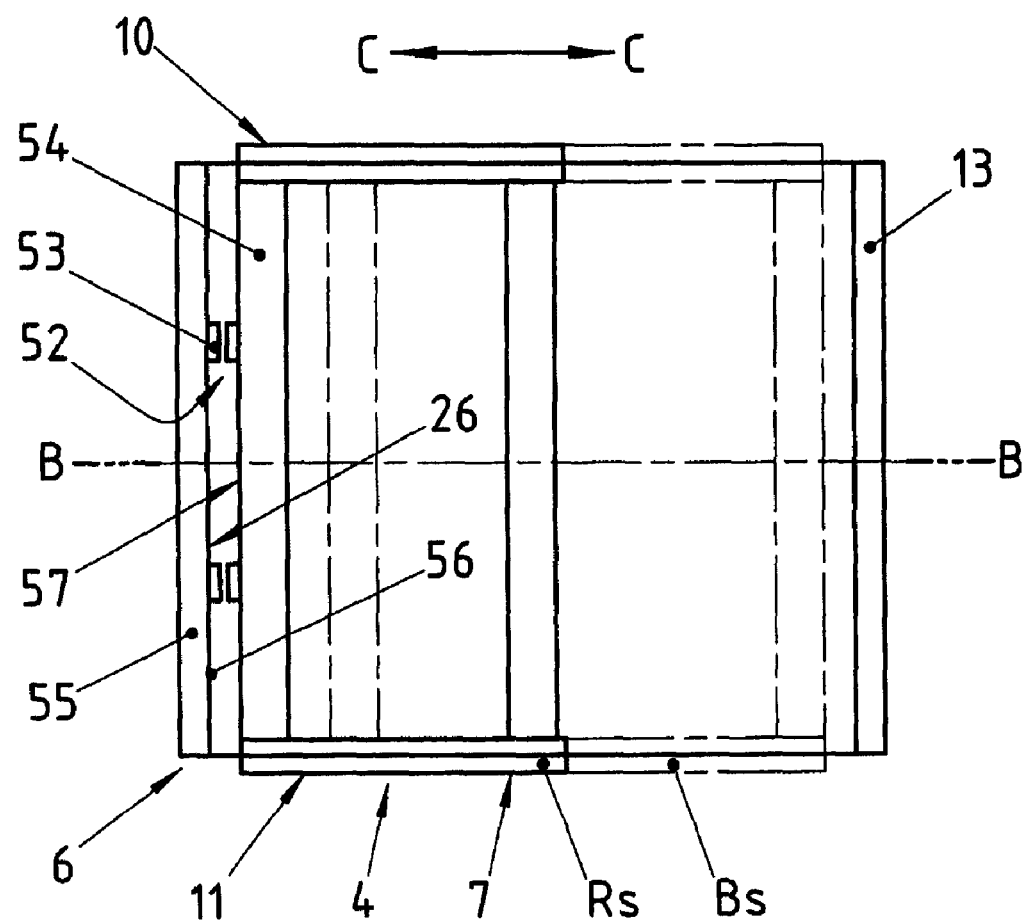
FIG. 6 illustrates a schematic top view of the bicycle carrier.

Referring now to FIG. 6, with continual reference to FIGS. 1, 2, 3, 4, and 5, a schematic top view of carrier 4 is shown. An electrical switching device 52 is between base holder 6 and support holder 7. Switching device 52 switches tail light 12 off when tail light 12 is in stored position Abst and switches tail light 12 on when tail light 12 is in functional position Wist. Switching device 52 includes electrical switches 53. Switches 53 are between a front frame element 55 of base holder 6 and a front frame element 54 of support holder 7. In particular, each switch 53 includes a pair of switching components respectively located on mutually facing sides 56, 57 of frame elements 54, 55.

Each switch 53 is a Reed contact relay having a magnet and contact lugs. The contact lugs are joined to connecting wires. An electrical contact is established as soon as the magnetic field of the magnet is active via the connecting wires.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A bicycle carrier for a vehicle, the carrier comprising:
   a base holder mountable to a vehicle;
   a support holder for holding a bicycle, wherein the support holder is movably connected to the base holder to be movable along a longitudinal axis between a neutral position in which the holders extend over one another and an operating position in which the support holder extends out from the base holder;

a tail light movable between a stored position in which the tail light is stowed in the support holder and a functional position in which the tail light is connected to the support holder and extends outward from the support holder transversely to the longitudinal axis; and a release device having a plug-in connector, a housing, a fixing device, an actuating mechanism, and a hand lever;

the plug-in connector having a receiving element connected to the support holder and an insertion element connected to the tail light, the receiving element having first and second walls spaced apart from one another along an axial axis, the first wall of the receiving element having an open space therein, the insertion element inserts transversely to the axial axis into the receiving element between the walls of the receiving element to connect the tail light to the support holder when the tail light is in the functional position;

the housing having first and second walls spaced apart from one another along the axial axis, the first wall of the housing having a first open space therein and the second wall of the housing having a second open space therein, the second open space of the second wall of the housing and the open space of the first wall of the receiving element being in communication with one another;

the fixing device having a spring and a locking member both within the housing and aligned along the axial axis, the spring extending between the first wall of the housing and the locking member such that the spring biases the locking member along the axial axis away from the first wall of the housing and towards the second wall of the housing with a portion of the locking member extending along the axial axis through the second open space of the second wall of the housing and the open space of the first wall of the receiving element and into the receiving element between the walls of the receiving element;

the actuating mechanism having an actuating pin extending along the axial axis through the first open space of the first wall of the housing between the outside of the housing and the locking member, the actuating pin being movable along the axial axis to move the portion of the locking member along the axial axis between a locked position in which the portion of the locking member engages the insertion element when the insertion element is inserted into the receiving element to thereby fixedly connect the tail light to the support holder and an unlocked position in which the portion of the locking member disengages from the insertion element when the insertion element is inserted into the receiving element to thereby enable the tail light to be disconnected from the support holder; and the hand lever operable with the actuating pin to move the actuating pin along the axial axis to the unlocked position in response to the hand lever being moved transversely to the axial axis about an axial pin oriented transverse to the actuating pin;

wherein the actuating pin includes a thread for a screw nut by which the hand lever is fastened to the actuating pin.

2. The carrier of claim 1 wherein:

the receiving element and the insertion element of the plug-in connector each have a tubular body.

3. The carrier of claim 1 wherein:

the locking member includes a pressure plate having a friction-enhancing lining.

4. The carrier of claim 1 wherein:

the housing is part of a tubular body on the receiving element.

5. The carrier of claim 1 wherein:

the tail light is fastened in the support holder while the tail light is in the stored position;

wherein the support holder includes a storage compartment for receiving the tail light when the tail light is in the stored position.

6. The carrier of claim 1 wherein:

the insertion element is connected in an angularly displaceable manner to the tail light via an articulated joint.

7. The carrier of claim 1 wherein:

the spring is a compression spring.

8. The carrier of claim 7 wherein:

the actuating pin is enclosed by the compression spring.

9. The carrier of claim 1 wherein:

each holder includes a frame element extending transversely to the longitudinal axis, wherein the frame elements meet when the support holder is in the neutral position;

the carrier further comprises an electrical switch having a pair of switching components respectively located on the frame elements, wherein the switching components contact one another to activate the switch when the frame elements meet when the support holder is in the neutral position;

wherein the switch is electrically connected to the tail light such that the switch disables the tail light while the support holder is in the neutral position and enables the tail light while the support holder is out of the neutral position.

10. The carrier of claim 9 wherein:

the switch includes a Reed contact relay.

* * * * *

UNITED STATES PATENT AND TRADEMARK OFFICE
CERTIFICATE OF CORRECTION

| | | |
|---|---|---|
| PATENT NO. | : 7,854,358 B2 | Page 1 of 1 |
| APPLICATION NO. | : 11/773077 | |
| DATED | : December 21, 2010 | |
| INVENTOR(S) | : Harald Bergerhoff et al. | |

It is certified that error appears in the above-identified patent and that said Letters Patent is hereby corrected as shown below:

Column 6, Line 6, Claim 1:

Delete
"wherein the actuating pin includes a thread for a screw nut by which the hand lever is fastened to the actuating pin"

and Insert:
-- wherein the actuating pin includes a screw nut threaded onto an end thereof, wherein the hand lever is fastened to the actuating pin by the screw nut --.

Signed and Sealed this
First Day of March, 2011

David J. Kappos
*Director of the United States Patent and Trademark Office*